June 21, 1960 A. H. HEINRICH 2,941,825
SEALING SYSTEM FOR BEARINGS, SHAFTS, ETC.
Filed Nov. 26, 1954 2 Sheets-Sheet 2
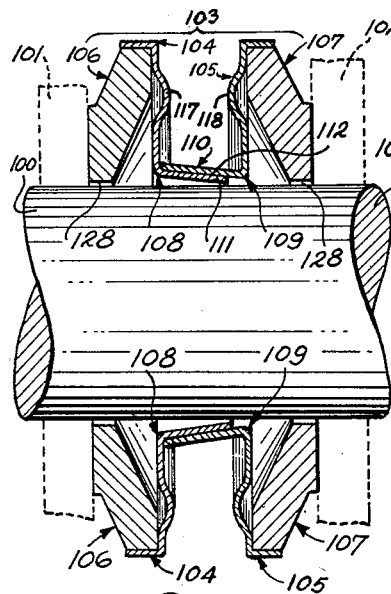
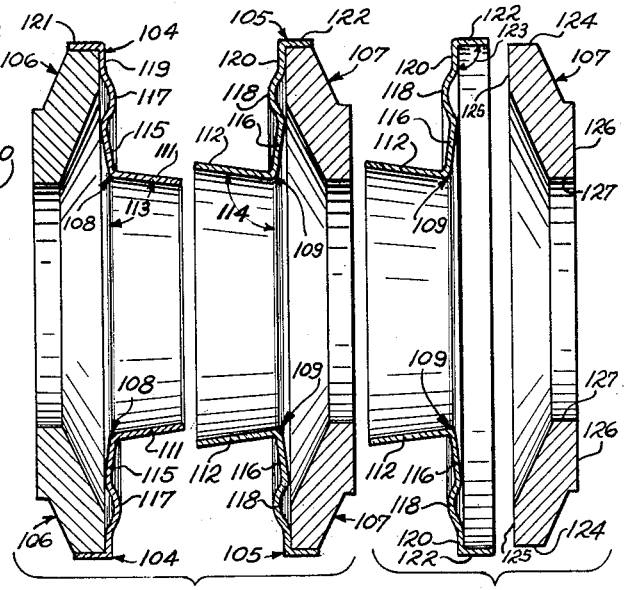
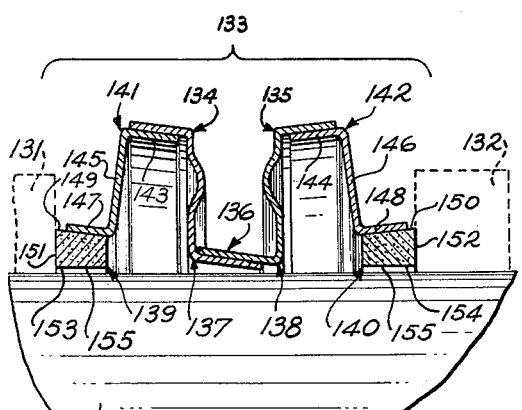
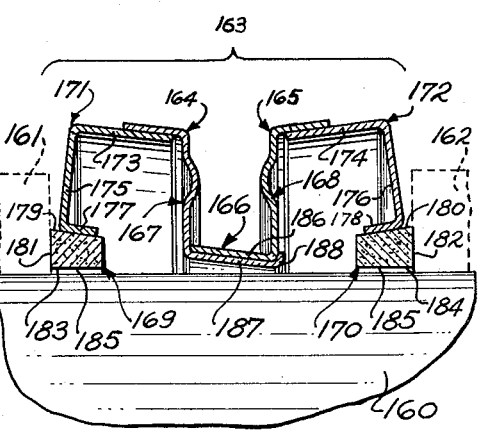
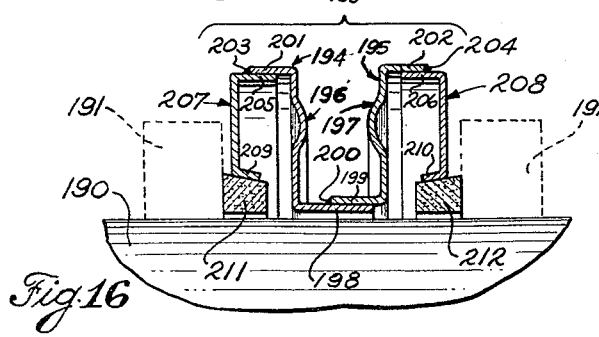
INVENTOR.
AUGUST H. HEINRICH
BY Bosworth, Sessions,
Herrstrom & Lawler
ATTORNEYS

United States Patent Office 2,941,825
Patented June 21, 1960

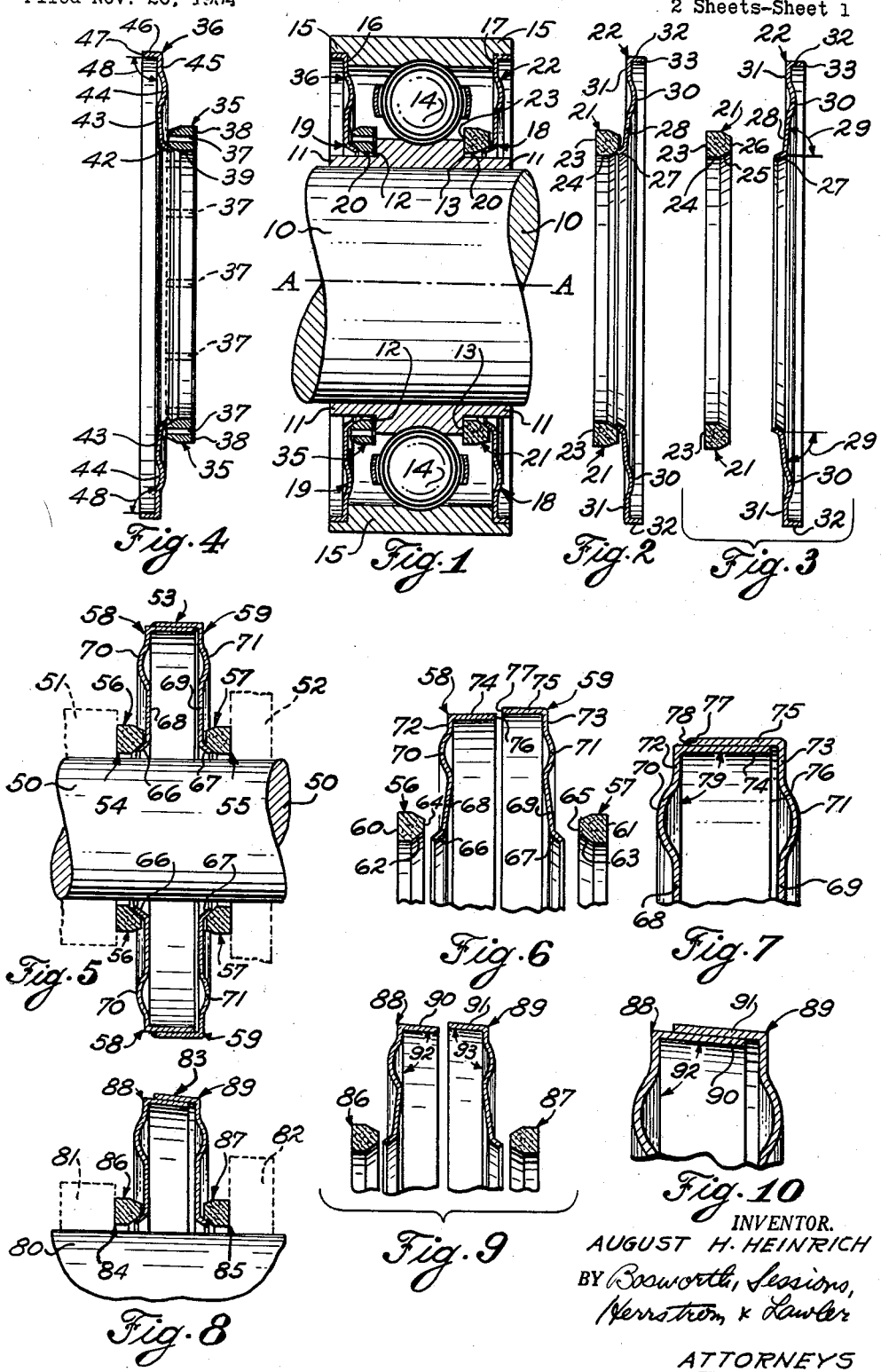

2,941,825

SEALING SYSTEM FOR BEARINGS, SHAFTS, ETC.

August H. Heinrich, Lyndhurst, Ohio; Adeline Heinrich, 1251 Richmond Road, Lyndhurst, Ohio, executrix of the estate of said August H. Heinrich, deceased Filed Nov. 26, 1954, Ser. No. 471,341

15 Claims. (Cl. 286—11)

This application, which is a continuation-in-part of prior application Serial No. 358,745, filed June 1, 1953, for "Sealing Systems," now U.S. Patent No. 2,776,851, issued on January 8, 1957, is directed to sealing systems for shafts, bearing assemblies, etc.

In industry generally there is a need, not always satisfactorily met, for sealing systems capable of standing up under adverse conditions, particularly temperatures above ordinary room temperatures, conditions of high humidity, and environmental atmospheres characterized by the presence of steam, chemical vapors and other troublesome factors. Often the incidence of one or more of these factors is complicated by the presence of sub- or superatmospheric pressures, either within or without a particular piece of equipment. When this is so, prevailing conditions often lead to quick deterioration, impairment of function and sometimes actual disintegration of sealing units characterized by sealing rings, packings, washers and other components of felt, leather and like non-metallic materials.

According to the present invention, vulnerable non-metallic materials, particularly if likely to be subjected to conditions of kinds just mentioned, are omitted; in lieu thereof, metallic and non-metallic materials selected for their ability to stand up under adverse conditions are employed. Metallic materials generally and some non-metallic materials of kinds hereinafter described stand up to much better advantage than most of the commonly used non-metallic materials; in addition, they frequently lend themselves to accurate finishing, thus permitting of the use of minimum clearances where there must be freedom for relative movement between adjoining parts. Sealing systems of the kinds with which the present invention deals therefore stand up for longer periods of time without replacement than conventional sealing systems of the kinds heretofore most commonly used.

It is one of the principal objects of the present invention to provide a sealing system incorporating a sealing unit that can be used for long periods of time without repair or replacement. It is a further object of the invention to provide a sealing system that is adaptable to widely differing uses, as, for example, in sealing a projecting shaft against the entry of contaminants into the machine of which the shaft forms part and in sealing a bearing assembly against the escape of lubricant. It is a further object of the invention to provide sealing units that are fluid-tight notwithstanding the fact that they may be subject to limited endwise movement in response to displacement of moving parts, changing pressure conditions, etc., such movement being tolerated without impairment of the effectiveness of the seal.

Still a further object of the invention is to provide a sealing system characterized by a sealing unit in which the sealing or bearing ring, although detachable, is held firmly in place in the sealing unit. To that end, one of its surfaces may, if desired, be tapered and engaged by a complementary tapered surface on a suitable mounting element, the two being so arranged that the tapered portions overlap. Where they overlap, the proximate surfaces of the bearing ring and mounting element are similarly but oppositely angled: in such a situation, the angle preferably is so shallow that the contacting parts adhere tenaciously to each other. In a specific aspect of the invention, the mounting element supporting the bearing ring is formed integrally with the annular metal spring constituting one of the components of the sealing unit; in another, the mounting element is itself detachable from the spring. In all of these situations, however, the bearing ring is solidly positioned in or on the mounting element, being susceptible of being detached from it only with the application of a considerable degree of force.

Still another object of the invention has to do with ways and means by which the sealing unit or units can be simply and securely mounted in the sealing assembly. In one of the simplest forms of the invention, a mounting flange extending at a substantial angle to the body portion of the previously mentioned annular metal spring is pressed onto or otherwise engaged with an annular shoulder in one of the races of an anti-friction bearing assembly; in more involved forms of the invention, in which a plurality of cooperating sealing units may be used, two oppositely directed mounting flanges may co-act with each other, in a manner such that each of two sealing units is, in a sense, mounted on the other. In furtherance of this aspect of the invention, the two opposed flanges may be arranged in telescopic fashion, one received within the other; if so, they may be tapered to encourage adherence between them or they may be held together by a metallic bond or by mechanical means designed to preclude the possibility of their disengagement. As will appear, the invention contemplates a variety of alternative ways for holding together two such sealing units.

Other objects and advantages of the invention will be apparent from the description which follows and from the accompanying drawings, in which:

Figure 1 is an enlarged vertical central section through a ball bearing assembly incorporating two different sealing units, one of which is seen at the left and the other of which is seen at the right;

Figure 2 is a like vertical central section through the sealing unit shown at the right in Figure 1;

Figure 3 is an exploded view showing in section the elements of the sealing unit of Figure 2;

Figure 4 is a similar vertical central section through the sealing unit shown at the left in Figure 1;

Figure 5 is a vertical central section through a sealing assembly designed for use on a pump shaft, motor shaft or the like;

Figure 6 is an exploded view showing in section the elements of the sealing assembly of Figure 5;

Figure 7 is a fragmentary enlargement of the sealing assembly of Figure 5;

Figure 8 is a vertical central section through a portion of a shaft-sealing assembly similar to that of Figure 5 in which, however, the sealing units are held together in a different way;

Figure 9 is an exploded view showing in section the elements of the sealing assembly of Figure 8;

Figure 10 is a fragmentary enlargement of the sealing assembly of Figure 8;

Figure 11 is an enlarged vertical central section through another form of shaft sealing assembly;

Figure 12 is a like vertical central section through the two sealing units used in the shaft sealing assembly of Figure 11;

Figure 13 is an exploded view showing in section the elements of the sealing unit at the right in Figure 12; and Figures 14, 15 and 16 are enlarged vertical central sections through portions of three other forms of shaft-sealing assemblies.

What is illustrated in Figure 1 is a horizontally mounted bearing assembly of the anti-friction type: although a ball bearing assembly is shown, it might equally well be some other more or less conventional form of anti-friction bearing assembly. Incorporated in it are two separate sealing units each of which is constructed in accordance with the teachings of the invention. In practice, the two units would normally be similar but as shown they differ from each other, partly in respect of the shape of certain elements thereof and partly in respect of the composition of their parts. The differences will be pointed out at greater length in the description which follows.

The anti-friction bearing assembly of Figure 1 is shown as mounted on the usual shaft 10. Shrunk onto the outer surface of the shaft or rigidly affixed thereto in some other suitable fashion is the inner race 11. The latter resembles the ordinary inner race of the conventional ball bearing assembly except for the fact that the end portions thereof are reduced or cut away so as to provide the annular shoulders 12 and 13, which extend as shown substantially at right angles to the axis A—A of shaft 10. These shoulders, which in their relation to the reduced end portions of the race are essentially square-cornered, constitute sealing surfaces and are therefore finished to a relatively high degree of accuracy, preferably being ground and lapped to a degree of smoothness within about two light bands. The sealing units described below bear against shoulders 12 and 13, thereby providing the desired sealing action.

The usual anti-friction elements, in this case bearing balls 14, intervene in the usual way between inner race 11 and outer race 15.

Outer race 15, like inner race 11, is reduced or cut away at its ends to form two annular shoulders; viz., shoulders 16 and 17. Ordinarily, shoulders 16 and 17 are likely to be square cornered, as shown, but if desired the angle which they appear to make when they are seen in cross section, as in Figure 1, may measure somewhat more or somewhat less than 90 degrees. Shoulders 16 and 17 are located somewhat closer to the end faces of outer race 15 than is the case with shoulders 12 and 13 on inner race 11. They can be formed by any suitable machining operation and do not have to be ground and lapped, although they should of course be finished with reasonable accuracy.

At the right as seen in Figure 1 a sealing unit 18 is shown as seated in the reduced areas which form shoulders 13 and 17 on inner race 11 and outer race 15. At the left as seen in Figure 1 a generally similar sealing unit 19, differently constructed, is shown as seated in the reduced areas which form shoulders 12 and 16. Sealing units 18 and 19, constituting separate sub-assemblies that can be made up, stored and introduced as such into the ball bearing assembly, appear as sub-assemblies in Figures 2 and 4, respectively. Sealing unit 18 is further shown in exploded fashion in Figure 3; although not shown in exploded fashion in the drawings, sealing unit 19 can if desired be separated into its two component elements just as is sealing unit 18 in Figure 3.

Both sealing units are so constructed and arranged that a suitable clearance 20, usually of the order of about .005" to .010", intervenes between them and the reduced end portions of inner race 11.

As will be apparent from Figures 2 and 3, sealing unit 18 consists of a bearing ring 21 and an annular metal leaf spring 22 of the type shown, described and claimed in prior application Serial No. 358,745, now U.S. Patent No. 2,776,851, issued on January 8, 1957. Bearing ring 21 can be of any conventional bearing metal such as stainless steel, bronze, Phosphor bronze or the like and, as in the case of graphite bronze, may in some circumstances contain a carbonaceous inclusion. Alternatively, it may be made of sintered metal; for example, "Oilite" may be used for the purpose. It may also be made of wear-resistant non-metals, including ceramics, plastics, and sundry other frangible, resilient and similarly yieldable materials. In one of the preferred forms of the invention, bearing ring 21 is made of compressed comminuted carbon that has been infiltrated with a metallic infusion such as lead, copper, tin or the like. The drawing illustrates a bearing ring made of finely divided carbon that has been compressed to form a smooth, hard, dense body with a low coefficient of friction.

Bearing ring 21 has an annular sealing face 23 which bears against the annular sealing face on shoulder 13 in inner race 11. Like the annular sealing face on shoulder 13, annular sealing face 23 on bearing ring 21 should be finished to a high degree of accuracy, usually within about two light bands. Certain of the other faces on bearing ring 21, including cylindrical face 24, tapered holding face 25 and flat back face 26, need not be finished to so high a degree of accuracy, although in most cases they should be machined to reasonably close tolerances; i.e., within a few thousandths of an inch. The shape and finish of the other two faces; i.e., those lying outwardly of sealing face 23 and cylindrical face 24, are not particularly important.

It should be noted that although tapered holding face 25 appears in Figures 1 to 3 of the drawings to make an angle of about 45 degrees to the proximate surface of inner race 11 (primarily for the reason that a greatly exaggerated representation is needed for clarity), the included angle so defined actually is of a very low order of magnitude, measuring from something less than 1 degree as a minimum up to about 7½ degrees as a maximum; in other words, the included angle between cylindrical face 24 and holding face 25 as seen in Figure 3 is upwards of about 172½ degrees but something less than 180 degrees. A shallow taper of this order of magnitude, e.g., a departure from the horizontal of less than about 7½ degrees, causes the bearing ring to adhere tenaciously to a supporting element formed with a complementary angle of taper, this without requiring the use of solder, brazing, fastening elements or the like. In such circumstances, where the angles of taper are similar but opposite, two metal parts cannot readily be separated manually but have to be pried apart, as by means of a screw driver or other hand-held tool; but if one is yieldable in the sense of being frangible or resilient, as may be true in the case of a bearing ring, it can be broken or distorted to effect its release from the other.

In the case of bearing ring 21, the comminuted carbon of which it is made is yieldable in the sense of being frangible or rather easily broken by means of a screw driver or similar tool; accordingly, bearing ring 21, even through having a tendency to adhere tenaciously to the supporting element, may readily be separated from it when replacement becomes necessary.

In the form of the invention shown in Figures 1 to 3, annular metal spring 22 carries a lip or lip-like supporting flange 27 of generally frusto-conical shape from which the bearing ring 21 is supported. Supporting flange 27 extends toward the axis of rotation of shaft 10 at a substantial angle to the body or main portion of spring 22. Although illustrated as if of an order of magnitude of about 45 degrees, such angle is from about 82½ degrees to something less than 90 degrees. It is complementary to the angle made by the holding face 25 of bearing ring 21. Like the latter angle, it departs by less than 7½ degrees from the horizontal as represented, for example, by axis A—A of shaft 10.

If, as in the form of the invention shown, spring 22 is a sheet metal stamping having in a typical case a thickness of .005", supporting flange 27 may be turned from the body of the spring when the spring itself is stamped out of the stock from which it is made. Although a thickness of about .005" is satisfactory for most purposes, the stock may be between about .003" and about .010" thick; in special cases, it may be even thicker or thinner. Although stainless steel is preferred for many uses, the spring may, if desired, be made of spring steel, spring brass, Phosphor bronze, nickel-chromium alloys, etc. It need not necessarily take the form of a stamping, but may, if desired, be made in any other suitable fashion.

Lying radially outward of supporting flange 27 is an annular portion 28, likewise frusto-conical in shape, which makes an angle of about 10 degrees to a plane perpendicular to axis A—A of shaft 10; i.e., to the general plane of the spring itself. Accordingly, angle 29, indicated in Figure 3, measures about 80 degrees. It may, however, be more or less, depending on the diameter of the bearing assembly. Thus angle 29 may be about 75 degrees or less in the case of a bearing assembly 5½ inches or more in diameter; 80 degrees in the case of a bearing assembly 3 inches in diameter; and, for bearing assemblies of smaller diameters, of magnitudes up to about 85 degrees. There is, therefore, a wide range over which angle 29 may vary.

Lying outwardly of annular portion 28 is an arcuate or bowed portion 30 having a radius of curvature which may range from ⅟₆₄" or less to ¼" or more, in a typical case being of the order of ⅟₁₆" or ⅛". Bowed portion 30 is shown as projecting outwardly from the bearing assembly as a whole but if desired it could project inwardly. Measured radially, its overall length is as a rule somewhat less than the length of annular portion 28, but in some situations it may equal or even exceed it. Outwardly of bowed portion 30 is a flat portion 31 which does not slant at an angle to but instead lies in the general plane of the spring as a whole. Flat portion 31 may be longer or shorter than is indicated as the case in Figures 2 and 3, but should in any event be long enough so that bowed portion 30 completely clears that portion of outer race 15 which is cut away to form shoulder 17.

At its outer periphery, spring 22 carries a mounting flange 32 which makes an angle of approximately 90 degrees to flat portion 31. The square-cornered shoulder so formed in spring 22 fits into shoulder 17 in outer race 15. Flange 32 is of a length such that its outer edge 33 is substantially flush with the end face of outer race 15. In order that spring 22 may be pressed into place in outer race 15, the overall diameter of spring 22 measured from flange 32 on one side of the spring to flange 32 on the diametrically opposite side is preferably .001" or .002" greater than the diameter of shoulder 17. Thus spring 22 is actually somewhat oversized as compared with the diameter of the shoulder into which it is to fit. Where this relationship obtains, spring 22 may be pressed or otherwise forced into position in shoulder 17, thereby providing a construction in which the spring is firmly and non-rotatably anchored in place in outer race 15.

It is not necessary that shoulder 17 and the shoulder formed by mounting flange 32 on spring 22 should measure exactly 90 degrees; instead, they may measure slightly less or slightly more, for the precise value of the angle is not particularly important if a press fit is contemplated. For example, the angle may measure 95 degrees or even 100 degrees; if desired, it might measure 85 degrees or 80 degrees. In the latter case, outer race 15 would in effect be undercut slightly, thus giving rise to a situation in which spring 22 might, if desired, be snapped into position. Preferably, however, spring 22 is made a few thousandths of an inch larger than shoulder 17; if so, it can be pressed into place as previously described. If desired, mounting flange 32 can be held in position in outer race 15 by a metallic bond, as by welding, brazing or soldering it in place.

When spring 22 is pressed or snapped into place, annular portion 28, instead of retaining its frusto-conical contour, straightens out and assumes a position in which it stands at right angles to the axis of rotation of the bearing assembly. In other words, angle 29 increases in magnitude until it becomes a right angle. This state of affairs is illustrated in Figure 1, which shows two flat portions of spring 22 lying in a common plane transverse to the axis A—A of shaft 10. Spring 22 then holds bearing ring 21 firmly against inner race 11; however, angular movement between them (as opposed to movement in a direction paralleling the axis of rotation of the bearing assembly) is free to take place. Even endwise movement of one race relative to the other, provided it is not more than about .075", will not dislodge the sealing unit.

In the form of the invention shown in Figure 4, sealing unit 19 consists of a generally similar bearing ring 35 and a generally similar annular metal leaf spring 36. Bearing ring 35, which is illustrated as of bearing metal, is bored as shown at more or less regular intervals around its periphery. The openings 37 so formed permit air to pass from one side of bearing ring 35 to the other, this under the influence of the forces set in motion by rotation of shaft 10. If, as may be the case, the bearing assembly is not packed with lubricant, this movement of air through openings 37 tends to reduce the temperature that is developed where bearing ring 35 makes contact with inner race 11. It will be noted that the back face of the bearing ring stands away from the proximate portion of the spring to permit this movement of air through the bearing ring.

To help reduce friction in this zone, bearing ring 35 may be coated at least on its sealing face with an overlay of a dry-film lubricant, such being indicated at 38. This overlay may take any one of various forms, including that of a film of low-friction metal deposited electrolytically on the sealing face of bearing ring 35. However, in a preferred form of the invention, such overlay consists of a layer of molybdenum disulphide bonded by means of a suitable resin to the metal of which the bearing ring is made. The advantages of using such an overlay, particularly if of molybdenum disulphide, are a marked reduction in friction between adjoining surfaces, a reduction in the developed temperatures, and a longer useful life for the bearing ring.

An example of a particularly useful material is the suspension of molybdenum disulphide sold by Acheson Colloids Co., Port Huron, Michigan, as Dag Dispersion #223. The latter is understood to be a suspension of colloidal molybdenum disulphide in an epoxy resin solution. In the preferred form of the invention, this material is applied as a liquid to the sealing face of the bearing ring, allowed to dry for about an hour, and then heated to a temperature of about 350 degrees F. for a period of time sufficient to drive off any remaining volatile components. Materials of a kindred nature are sold by Climax Molybdenum Company, New York, New York, and Stevenson Oil Company, Cleveland, Ohio.

As is apparent from Figure 4, bearing ring 35 is mounted on a lip or lip-like supporting flange 42 similar to lip-like supporting flange 27 (Figures 1 to 3). Lying outwardly of it are a frusto-conical portion 43, a bowed portion 44, and a second flat portion 45, all of which are generally similar to the corresponding parts of the previously-described embodiment of the invention. It will be noted that in Figure 4 bowed portion 44 projects inwardly toward rather than outwardly from the bearing interior of the assembly. If desired, it could to equal advantage project the other way.

Spring 36 is provided along its outer periphery with a mounting flange 46 extending approximately at right angles to the general plane of the spring, although it may make an angle of slightly more or slightly less than 90 degrees. The length of mounting flange 46 is such that outer edge 47 thereof is flush with the end face of outer race 15. Spring 36 is preferably pressed into place on shoulder 16, although it may, if desired, be snapped into place or fixed in position in some other way. By so mounting spring 36 in outer race 15, bearing ring 35 is held firmly in place in contact with shoulder 12 on inner race 11. Thus an effective seal is provided which serves to keep contaminants from entering into and lubricants from escaping from the bearing assembly.

Figures 5 to 7 show a shaft sealing system for a pump, motor, generator or the like in which two sealing units of the type already described are combined by mounting one on the other in a manner such as to produce a particularly compact sealing assembly. In Figure 5, shaft 50 is shown as encompassed by a stationary element 51 such as a bushing that is itself incorporated in the body or frame of the machine and by a movable element 52 such as the end of a collet housing, the hub of a pump impeller or the like. Usually, but not necessarily, the movable element is mounted on shaft 50. The sealing assembly as a whole, designated 53, consists of two generally similar sealing units 54 and 55. Although the two sealing units are not completely identical in other respects, each embraces a bearing ring (56, 57) that is supported from an annular metal leaf spring (58, 59).

As appears from Figure 6, bearing rings 56 and 57 have outwardly directed sealing faces 60 and 61, respectively. As in the previously described embodiments of the invention, these faces and also the surfaces against which they bear are finished with a very high degree of accuracy, preferably within about two light bands. Respectively, bearing rings 56 and 57 are provided with tapered holding faces 62 and 63 and flat back faces 64 and 65. In general, bearing rings 56 and 57 conform in shape, make-up and characteristics to bearing ring 21 of the embodiment of the invention shown in Figures 1 to 3.

Springs 58 and 59 carry lips or lip-like supporting flanges 66 and 67 which as shown in Figures 5 and 6 appear to be inclined from the horizontal by approximately 45 degrees. Actually, these supporting flanges are nearly perpendicular to the body or main portion of springs 58 and 59, departing from the horizontal by shallow angles measuring in each case from a minimum of less than a degree or so to a maximum of the order of 7½ degrees. Holding faces 62 and 63 on bearing rings 56 and 57 are tapered in complementary fashion; therefore, they also depart from the horizontal by a rather shallow angle. As already explained, this relationship between the two parts results in a state of affairs in which there is tenacious adherence between holding faces 62 and 63 on one hand and supporting flanges 66 and 67 on the other.

Like annular metal leaf springs 22 and 36 in Figures 1 to 4, springs 58 and 59 incorporate frusto-conical portions 68 and 69 which are so angled that they depart from the vertical by approximately 10 degrees. Lying outwardly of portions 68 and 69 are bowed portions 70 and 71. The latter present the same relationship to bearing rings 56 and 57 as that presented by bowed portion 44 to bearing ring 35 in Figure 4; i.e., the direction of bowing is outward away from the interior of the sealing assembly. This direction might be reversed, if desired, in which case the bowing would be toward rather than away from the interior of the sealing assembly. Outwardly of bowed portions 70 and 71 are flat portions 72 and 73, each of which may be considered to be in the general plane of the spring of which it forms part.

Along the outer peripheries of springs 58 and 59, respectively, are mounting flanges 74 and 75, the edges of which appear in Figure 6 at 76 and 77. Flanges 74 and 75 overlap as best seen in Figure 7 and are held fast to each other by a metallic bond such as the weld, brazing or soldering indicated at 78. Each of flanges 74 and 75 makes a right angle with the general plane of the springs of which it forms part: this relationship is indicated in Figure 7 by right angle 79. To permit flanges 74 and 75 to telescope as shown, the diameter of spring 59 of which flange 75 forms part must be slightly larger than the diameter of spring 58 of which flange 74 forms part, the difference in overall diameters being twice the thickness of the metal stock of which the springs are made. Preferably, flange 74 on spring 58 is slightly longer than flange 75 on spring 59, this so that edge 76 of the former can butt up against the body or main portion of spring 59. In the drawings, a slight clearance has been left between these parts in the interests of clarity of representation.

When mounting flanges 74 and 75 are telescoped and bonded together in the manner described, sealing units 54 and 55 form the previously mentioned unitary sealing assembly 53, which as stated includes springs 58 and 59 and bearing rings 56 and 57. At this stage, the two springs are no longer detachable from each other; however, either or both of the two bearing rings may be detached from the assembly as a whole by separating it from the lip or lip-like supporting flange on which it is mounted, 66 or 67 as the case may be. If, in Figures 5 to 7, bearing rings 56 and 57 are assumed to be of compressed comminuted carbon, they may be removed by prying against them or breaking them with a screw driver or similar tool. They may then be replaced by applying new bearing rings to supporting flanges 66 and 67, the mere pressure of the hand being entirely sufficient for this purpose.

From a comparison of Figures 5 and 6, it will be evident that when sealing assembly 53 is mounted on shaft 50, the frusto-conical shape originally characterizing portions 68 and 69 of springs 58 and 59 largely disappears, such portions standing thereafter in perpendicular or nearly perpendicular relationship to the axis of shaft 50. If it is assumed that bearing ring 56 bears against a stationary element 51 such as a bushing and that bearing ring 57 bears against a moveable element 52 such as the hub of a pump impeller, the latter will normally be adjustable lengthwise of shaft 50 to a position corresponding to that illustrated in Figure 5, in which springs 58 and 59 are represented as extending normally to the axis of rotation of the shaft. Moveable element 52 is of course urged lengthwise of shaft 50 against the resistance offered by springs 58 and 59 until it is in the desired position, after which it is made fast to the shaft as by a set screw.

Figures 8, 9 and 10 show a generally similar shaft sealing system in which a shaft 80 is encompassed by a fixed element 81 and a moveable element 82 of the nature of a collect housing, pump impeller or the like. Sealing assembly 83 is unitary but consists of two sealing units, 84 and 85, each of which is mounted in or on the other as hereinafter explained. The two sealing units comprise the two bearing rings 86 and 87, which are similar to the bearing rings already described, and the two annular metal leaf springs 88 and 89. The latter are generally similar to the springs 58 and 59 of the last described embodiment of the invention except where they are brought together and caused to telescope.

As is apparent from Figure 9, the outer periphery of spring 88 is provided with a mounting flange 90 which makes an acute angle with what may be called the general plane of the spring. Such angle, indicated at 92, is less than a right angle, measuring in value from about 82½ degrees to something a few minutes short of 90 degrees. Thus flange 90 in effect tapers in an inward direction from the outer periphery of spring 88 toward the axis of rotation of shaft 80. Spring 89, which is slightly larger in diameter than spring 88, is provided with an opposing flange 91 which defines a complementary angle 93 measuring slightly more than 90 degrees, usually in the range from just above 90 degrees up to about 97½ degrees. Provided the departure from the horizontal is the same in both cases and not more than about 7½ degrees, the two flanges can be made to telescope or nest by the mere pressure of the hand, the flange 90 on spring 88 fitting within the flange 91 on spring 89, as best shown in Figure 10.

Tenacious adherence between the two is obtained under such circumstances. It is not even necessary that the edge of flange 90 on spring 88 butt up against the body or main portion of spring 89 so long as there is a substantial degree of overlap, such, for example, as that indicated in the drawings, particularly in Figure 10. Once the two springs have been fitted together in this manner, it is all but impossible to separate them manually, a suitable tool of some kind being required to force them apart.

Still a different embodiment of the invention is shown in Figures 11 to 13, inclusive, which likewise relate to a shaft sealing system. Shaft 100 is shown as encompassed by a bushing 101 and a collet housing 102. Between them is a shaft sealing assembly 103 made up of two non-identical but generally similar sealing units 104 and 105. It will be observed that each of the two sealing units consists of a bearing ring (106, 107) and an annular metal leaf spring (108, 109). The two sealing units are shown in Figure 12 as spaced slightly from each other; i.e., as they appear immediately before they are brought together to form sealing assembly 103. In Figure 13, spring 109 is shown as separated from the bearing ring 107 which is used with it to make up sealing unit 105.

The two sealing units are integrated to form sealing assembly 103 by the telescopic joint indicated generally at 110 (Figure 11). Such joint makes use of tapered mounting flanges 111 and 112 on springs 108 and 109, respectively. It is located close to the periphery of shaft 100 rather than at a considerable distance from it, as is the case in the embodiment of the invention shown in Figures 8 to 10. From Figure 12 it will be seen that spring 108 carries tapered mounting flange 111 which is angled from its inner periphery toward the axis of rotation and that spring 109 carries tapered mounting flange 112 which is angled from its inner periphery away from the axis of rotation. In the case of the former, angle 113 measures slightly less than 90 degrees, for example, about 85 degrees; in the case of the latter, angle 114 measures slightly more than 90 degrees, for example, about 95 degrees. Angles 113 and 114 are complementary, the two together adding up to 180 degrees.

In each of the two angles, the departure from the horizontal is by a relatively small amount, usually less than 7½ degrees. The shallow taper that results where the departure from the horizontal is of this order of magnitude introduces the previously described tenacious adherence that comes into being when tapered parts bearing these relationships to each other are brought into contact. It will be noted from Figure 11 that mounting flange 112 on spring 109 is slightly larger and somewhat longer than mounting flange 111 on spring 108. The difference in diameter in any given vertical plane in the zone of overlap is twice the thickness of the metal stock from which the springs are formed. The reason for making flange 112 somewhat longer than flange 111 is so that when the two flanges are brought together in telescopic relation the edge of flange 112 can abut the main or body portion of spring 108, thus limiting further movement and determining the final positions of the two springs.

As appears from Figure 12, springs 108 and 109 are characterized by frusto-conical portions 115 and 116, by bowed portions 117 and 118, and by flat portions 119 and 120 lying in the general planes of the two springs: these elements are similar to the corresponding elements in previously described embodiments of the invention.

At its outer peripheral edge, spring 108 carries a lip or lip-like supporting flange 121 for receiving bearing ring 106; similarly, spring 109 carries a lip or lip-like flange 122 for receiving bearing ring 107. Supporting flanges 121 and 122 extend at right angles to flat portions 119 and 120 of springs 108 and 109, respectively; accordingly, angle 123 (Figure 13) measures 90 degrees. A press fit is employed to retain bearing ring 106 in flange 121; similarly, a press fit is employed to retain bearing 107 in flange 122. In applying flanges 121 and 122 to bearing rings 106 and 107, pressure is applied to the outside faces of the flanges, forcing them into intimate contact with the bearing rings. The latter are thus held securely in place but are nevertheless susceptible of being detached by the application of a screw driver or other tool that can be used to pry the springs away from the bearing rings.

Figure 13 shows how the two bearing rings are formed. Each has a cylindrical holding face 124 for engagement with the lip-like flange on the spring. Each has a perpendicular back face 125 which seats against the body or main portion of the spring. The square-cornered shoulder so formed on the bearing ring this fits the square-cornered shoulder formed by the flange on the outer periphery of the spring. On the opposite side of the bearing ring is the bearing face designated 126. It takes the form of a flat annular face finished to a degree of smoothness within about two light bands: it bears against a similarly finished surface on bushing 101 or collet housing 102, as the case may be. Along its inner periphery, the bearing ring has a cylindrical face 127 which fits with a running fit on shaft 100, there being a clearance 128 (Figure 11) of the order of about .005" to .010". Bearing rings 106 and 107 are cross-hatched to represent metal, but it should be understood that they could be made of any other suitable bearing ring material.

Figure 14 shows a shaft sealing system in which a shaft 130 is encompassed by stationary and rotatable elements 131 and 132, respectively. The shaft is sealed by the sealing assembly designated 133. The latter consists of two sealing units 134 and 135 telescoped together at joint 136, such joint being similar to joint 110 of the embodiment of the invention shown in Figures 11 to 13 in that it comprises two tapered mounting flanges in overlapping relation to each other. Sealing units 134 and 135 consist of the annular metal leaf springs 137 and 138, the compacted carbon bearing rings 139 and 140, and the reversely flanged elements 141 and 142, which elements take the form of annular sheet metal stampings. Elements 141 and 142 are provided with outer flanges 143 and 144 that fit into overlying lips or lip-like flanges on the outer peripheries of springs 137 and 138. The joints between them are generally similar to the type of tapered joint shown in Figures 8 to 10.

Elements 141 and 142 are characterized, among other things, by annular spacers or connecting portions 145 and 146 which extend toward shaft 130 at right angles to flanges 143 and 144, respectively. From the outer portions of spacers 145 and 146, flanges 143 and 144 project toward the interior of the sealing assembly; from their inner portions, oppositely directed lips or lip-like flanges 147 and 148 project away from the interior of the sealing assembly. The latter serve as means for holding bearing rings 139 and 140 in position in sealing units 134 and 135, respectively. To that end, they are tapered as shown, the angle of taper departing from the horizontal by something less than 7½ degrees. In contact with them are the tapered holding faces 149 and 150 on bearing rings 139 and 140, respectively, the angles of which complement the angles of flanges 147 and 148.

Thus a tenacious fit is provided by means of which the bearing rings are held firmly in position on elements 141 and 142. As is apparent from Figure 14, bearing rings 139 and 140 have outwardly directed bearing faces 151 and 152, preferably finished to a degree of smoothness within about two light bands. Respectively, sealing faces 151 and 152 cooperate with similarly finished sealing surfaces on stationary and rotatable elements 131 and 132, the former being, for example, a bushing on a pump housing; the latter, in a typical case, the hub of a pump impeller. Bearing rings 139 and 140 have cylindrical faces 153 and 154 where they fit around shaft 130. The fit is a running fit in each case, the clearance 155 being of the order of .005" to .010".

Figure 15 shows a generally similar sealing system in which the elements carrying bearing rings take the form of channel-like stampings of sheet metal. Shaft 160 rotates within a stationary element 161 and carries with it a moveable element 162. Between these two elements is the sealing assembly 163 consisting of two generally similar sealing units 164 and 165. The latter are coupled together as at 166 by means of a telescopic joint formed by two overlapping mounting flanges each of which forms part of one of the two annular metal leaf springs 167 and 168. Joint 166 is similar to joint 136 (Figure 14) except that lower flange 187 is longer than upper flange 186. Although the latter butts up against the body or main portion of spring 167, the former is of such length that it can conveniently be turned up as at 188 to hold the parts against disengagement. This may be done by rolling, spinning, crimping or in any other suitable manner.

Elements 171 and 172 are generally channel-shaped, being characterized by long outer flanges 173 and 174, annular connecting portions or spacers 175 and 176, and short inner lips or lip-like supporting flanges 177 and 178. The latter, which project toward the interior of sealing assembly 163, co-act with holding faces 179 and 180 on bearing rings 169 and 170, respectively. These parts are tapered in the manner already described so as to provide a tenacious fit, the angle of departure from the horizontal being less than about 7½ degrees. Sealing faces 181 and 182, which are directed away from the interior of sealing assembly 163, make contact with stationary and rotatable elements 161 and 162, respectively, the contacting surfaces being finished to a degree of smoothness within about two light bands. Cylindrical faces 183 and 184 fit around shaft 160, the clearance 185 being such as to provide a running fit.

Figure 16 shows a sealing assembly which in some ways is generally similar to that of Figure 15 except that certain of the parts are held together by metallic bonds, as by welding, brazing, soldering or the like. Shaft 190, which is encompassed by stationary and rotatable elements 191 and 192, is sealed by means of sealing assembly 193. The latter consists of two cooperating sealing units 194 and 195 held together in telescopic arrangement. Such sealing units incorporate annular metal leaf springs 196 and 197, respectively. The latter are provided with oppositely directed mounting flanges 198 and 199, which, instead of being tapered, stand at right angles to the general planes of the springs with which they are associated. Held together by weld metal as indicated at 200, they are of diameters such that flange 198 fits snugly within flange 199.

At their outer peripheries, springs 196 and 197 carry lips or lip-like supporting flanges 201 and 202, which parallel mounting flanges 198 and 199 but extend oppositely to them. Held by welds 203 and 204 to supporting flanges 201 and 202, respectively, are channel-shaped elements 207 and 208 of sheet metal. In addition to outer flanges 205 and 206, elements 207 and 208 include inner lips or lip-like supporting flanges 209 and 210. The latter are tapered and in contact with tapered holding faces on bearing rings 211 and 212, respectively. The angles on the tapered contacting surfaces are complementary. The departure from the horizontal is not more than 7½ degrees, as a result whereof bearing rings 211 and 212 are firmly supported by mounting elements 207 and 208, respectively. Clearances where mounting flange 198 and bearing rings 211 and 212 encompass shaft 190 are of the order of .005".

From the foregoing it should be apparent that the invention may take any one of a wide variety of forms, including simple systems such as those of Figures 1 to 4 and complex systems such as those of Figures 14 to 16. Although more or less symmetrical forms are illustrated in Figures 5 to 16, the invention may, if desired, be utilized in forms of non-symmetrical nature, as, for example, where a sealing unit immediately adjoining a collet housing or other movable element is omitted and the sealing unit adjoining the bushing or other stationary element is itself attached to the movable element, as in certain of the sealing systems shown and described in prior application Serial No. 358,745, now U.S. Patent No. 2,776,851, issued on January 8, 1957. Other changes of this sort can be expected to be made by persons skilled in the art.

So far as concerns the materials used in the various embodiments of the invention, it will be apparent to those skilled in the art that substitutions may be made over a very broad range. Thus in any of the various sealing systems shown and described, the bearing ring may be of metal or of non-metal; if of the latter, it may comprise a material such as hard rubber, a synthetic material such as a rigid plastic, or a ceramic material. The metal parts, including the reversely flanged and channel-shaped elements shown in Figures 14 to 16 as carrying the bearing rings, may be of any one of a wide variety of suitable metals; preferably, however, they take the form of stampings of half-hard or three-quarters hard stainless steel of a gauge lending itself to easy working; e.g., from .005" to .010" in thickness. However, it is not imperative that such parts be formed as stampings: they may, if desired, be made in any other suitable fashion.

It will further be apparent that in many instances the relationships may be reversed or otherwise modified while still preserving the advantages of the invention. Similarly, in the various forms of the invention which are illustrated as employed with or applied to shaft sealing systems, the bearing rings may, if desired, make contact with the so-called stationary and movable elements in zones remote from the shaft rather than in zones adjacent to it. As an example, in the shaft sealing system of Figures 11 to 13, the bearing ring or rings need not extend radially inward into juxtaposition to the surface of thte shaft but may stand well away from it, in which case the clearance between them will of course be correspondingly great.

In many such situations, the bearing ring or rings may be held in place by a lip or lip-like supporting flange making contact with a holding face on the opposite side of the bearing ring from the holding face utilized for that purpose in the form of the invention illustrated in the drawings. Thus in the sealing units of Figures 1 to 4, the lip-like flanges supporting the bearing rings may be angled outwardly rather than inwardly, as shown, so as to permit them to make contact with tapered holding faces on the outside peripheries rather than on the inside peripheries of the bearing rings. The same is true as regards the sealing units of Figures 5 to 7 and 8 to 10. Similarly, in the sealing assembly of Figure 14 the bearing rings could, if desired, be tapered on their inner peripheries rather than on their outer peripheries and, if so, could be held in place by supporting flanges of complementary taper positioned inside rather than outside the bearing rings themselves.

For convenience in describing the invention, it has been assumed up to this point that in each case the sealing system is used on a shaft turning about a horizontal axis. It is evident that the shaft and associated sealing system might equally well turn about a vertical axis or about an inclined axis. It should be understood that where, for convenience, reference has been made in the specification to a departure from the horizontal, such reference is to be taken as descriptive of the horizontally disposed sealing systems shown by way of example in the accompanying drawings. Obviously, if the shaft and sealing system were to rotate about a vertical axis, it would be appropriate to speak in the same sense of a departure from the vertical. In the case of any of the various sealing systems shown and described, such things as dimensions, ratios and similar factors may usually be varied over a considerable range, depending in part on whether the sealing system is for use with a shaft measuring a small fraction of an inch in diameter or for use with a shaft of large diameter such, for example, as would be found in a rolling mill.

One important advantage of the invention lies in the ease with which a tapered bearing ring or other tapered component may be removed from the part by which it is carried, this without regard to whether the latter takes the form of a separate element, as in Figures 14 to 16, or the form of a simple form of lip or lip-like supporting flange that is integral with and carried by the spring at its inner or outer periphery. An appropriately tapered bearing ring may be applied to an appropriately tapered supporting part by simply bringing the two into juxtaposition and urging them together by the mere pressure of the hand. As previously explained, they can be separated by breaking the bearing ring or prying them apart if replacement becomes necessary, after which a new bearing ring may be substituted for the old one. In some cases, particularly in the forms of the invention shown in Figures 11 to 14, the bearing ring together with the element by which it is carried can be treated as if of unitary construction, being removed together from the rest of the assembly and repaired or replaced as may be desired or necessary.

It is intended that the patent, by summarization in the appended claims, shall cover all features of patentable novelty residing in the invention.

What I claim is:

1. A sealing assembly for shafts, bearings and the like comprising two outwardly facing bearing rings, each having a flat sealing face; means for supporting said bearing rings with their sealing faces in contact with the surfaces to be sealed; two annular metal leaf springs from which said supporting means are themselves supported; and two opposed mounting flanges, one on each of said annular metal springs, connecting said springs in telescopic fashion, the connection being such that each of the two flanges is held fast to the other.

2. A sealing assembly as in claim 1 in which each of the flanges is a frusto-conical flange of non-uniform diameter.

3. A sealing assembly as in claim 1 in which each of the flanges is a cylindrical flange of uniform diameter.

4. A sealing assembly as in claim 1 in which the flanges are held fast to each other by a metallic bond.

5. A sealing assembly as in claim 1 in which the edge of the outer flange butts up against the spring carrying the inner flange.

6. A sealing assembly as in claim 5 in which the edge of the inner flange is turned up into contact with the body of the spring carrying the outer flange.

7. A sealing assembly for shafts, bearings and the like comprising a first annular metal leaf spring having inner and outer peripheries and a bowed portion between them; a second annular metal leaf spring having inner and outer peripheries and a bowed portion between them; a mounting flange on each of said springs along one of its two peripheries, one of said mounting flanges being received within and engaged by the other; means in the zone of mutual engagement of said mounting flanges for restraining said mounting flanges from disengaging themselves from each other; a lip-like supporting flange on each of said springs along the other of its two peripheries; and, supported from said lip-like supporting flanges, detachable bearing rings provided with outwardly directed sealing faces for contact with the surfaces to be sealed.

8. A sealing assembly as in claim 7 in which the lip-like supporting flanges project substantially at right angles to the sealing faces of the bearing rings.

9. A sealing assembly as in claim 7 in which the lip-like supporting flanges project away from the space between the two springs.

10. A sealing assembly for shafts, bearings and the like comprising a first annular metal leaf spring having inner and outer peripheries and a bowed portion between them; a second annular metal leaf spring having inner and outer peripheries and a bowed portion between them; a mounting flange on each of said springs along one of its two peripheries, one of said mounting flanges being received within and engaged by the other; means in the zone of mutual engagement of said mounting flanges for restraining said mounting flanges from disengaging themselves from each other; a lip-like flange on each of said springs along the other of its two peripheries; a supporting annulus carried by each of said lip-like flanges; and, carried by said supporting annuli, detachable bearing rings provided with outwardly directed sealing faces for contact with the surfaces to be sealed.

11. A sealing assembly as in claim 10 in which the supporting annuli are channel-shaped.

12. A sealing assembly as in claim 10 in which the supporting annuli are reversely flanged.

13. A sealing assembly for shafts, bearings and the like comprising two outwardly facing bearing rings, each having a flat sealing face; means for supporting said bearing rings with their sealing faces in contact with the surfaces to be sealed, said supporting means taking the form of annuli; two annular metal leaf springs from which said supporting annuli are themselves supported; and two opposed mounting flanges, one on each of said annular metal springs, connecting said springs in telescopic fashion, the connection being such that each of the two flanges is held fast to the other.

14. A sealing assembly as in claim 13 in which the interfaces between the supporting annuli and the bearing rings are of frusto-conical shape.

15. A sealing assembly as in claim 14 in which the angle of taper of the frusto-conical surfaces is less than 7½ degrees.

References Cited in the file of this patent

UNITED STATES PATENTS

| | | |
|---|---|---|
| 1,769,030 | Lassen | July 1, 1930 |
| 1,931,733 | Leibling | Oct. 24, 1933 |
| 2,038,855 | Rosenblad | Apr. 28, 1936 |
| 2,067,464 | Smith | Jan. 12, 1937 |
| 2,189,197 | Cerny | Feb. 6, 1940 |
| 2,267,994 | Reynolds et al. | Dec. 30, 1941 |
| 2,299,590 | Reynolds | Oct. 20, 1942 |
| 2,699,366 | Heinrich | Jan. 11, 1955 |
| 2,776,851 | Heinrich | Jan. 8, 1957 |

FOREIGN PATENTS

| | | |
|---|---|---|
| 308,391 | Great Britain | Mar. 28, 1929 |
| 601,296 | Great Britain | May 3, 1948 |